(12) United States Patent
Scheck et al.

(10) Patent No.: US 9,327,635 B2
(45) Date of Patent: May 3, 2016

(54) TURN INDICATOR SWITCH WITH ELECTROMAGNETIC LATCHING DEVICE

(71) Applicant: Ford Global Technologies, LLC, Dearborn, MI (US)

(72) Inventors: Martin Scheck, Pulheim NRW (DE); Thomas Oeltjebruns, Dormagen-Straberg NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/444,481

(22) Filed: Jul. 28, 2014

(65) Prior Publication Data
US 2015/0035669 A1     Feb. 5, 2015

(30) Foreign Application Priority Data

Aug. 2, 2013   (DE) .......................... 10 2013 215 201

(51) Int. Cl.
*B60Q 1/40*          (2006.01)
*B60Q 1/00*          (2006.01)
(Continued)

(52) U.S. Cl.
CPC ................ *B60Q 1/0082* (2013.01); *B60Q 1/34* (2013.01); *B60Q 1/387* (2013.01); *B60Q 1/40* (2013.01); *H01H 3/503* (2013.01)

(58) Field of Classification Search
CPC ...... B60Q 1/1469; B60Q 1/0082; B60Q 1/40; B60Q 1/42; B60Q 1/387; B60Q 1/34; H01H 3/503; H01H 23/00
USPC ...................... 340/476, 475, 478, 480, 425.5; 200/310, 6 A, 327, 335, 556; 335/170, 335/207
See application file for complete search history.

(56) References Cited

U.S. PATENT DOCUMENTS

| | | | | |
|---|---|---|---|---|
| 3,955,175 A | * | 5/1976 | Holt ......................... | B60Q 1/40 340/476 |
| 4,868,530 A | | 9/1989 | Ahs | |
| 6,020,813 A | * | 2/2000 | Harris ...................... | B60Q 1/40 116/37 |

(Continued)

FOREIGN PATENT DOCUMENTS

| | | |
|---|---|---|
| DE | 2119008 A1 | 11/1972 |
| DE | 2849686 A1 | 5/1980 |

(Continued)

OTHER PUBLICATIONS

German Patent Office, Examination Report for the corresponding German Patent Application No. 10 2013 215 202.7 dated Jun. 25, 2014.

*Primary Examiner* — Anh V La
(74) *Attorney, Agent, or Firm* — Frank A. MacKenzie; Brooks Kushman P.C.

(57) ABSTRACT

A switch for activating the turn signals (blinkers) of a vehicle is actuated by a lever movable from a central position in opposite first and second directions to respective first and second switching positions. A first electromagnet is located such that movement of the lever to the first switching position brings a portion of the lever closer thereto. A second electromagnet is located such that movement of the lever to the second switching position brings the portion of the lever closer thereto. A control unit controls energization of the first and second electromagnets in a manner to attract and/or repel the lever to alternatively: a) hold the lever in the first switching position; b) hold the lever in the second switching position; and c) release the lever to return to the central position from the first switching position and from the second switching position.

12 Claims, 1 Drawing Sheet

(51) Int. Cl.
*B60Q 1/34* (2006.01)
*B60Q 1/38* (2006.01)
*H01H 3/50* (2006.01)

(56) References Cited

U.S. PATENT DOCUMENTS 6,300,852 B1 * 10/2001 Kato .................... B60Q 1/1469
200/327

7,019,238 B2 * 3/2006 Kobayashi ........... B60Q 1/1469
200/310

8,087,488 B2 * 1/2012 Onuma .................. B62D 5/001
180/402

FOREIGN PATENT DOCUMENTS

| DE | 10039135 A1 | 2/2002 |
| DE | 102006052108 A1 | 7/2008 |

* cited by examiner

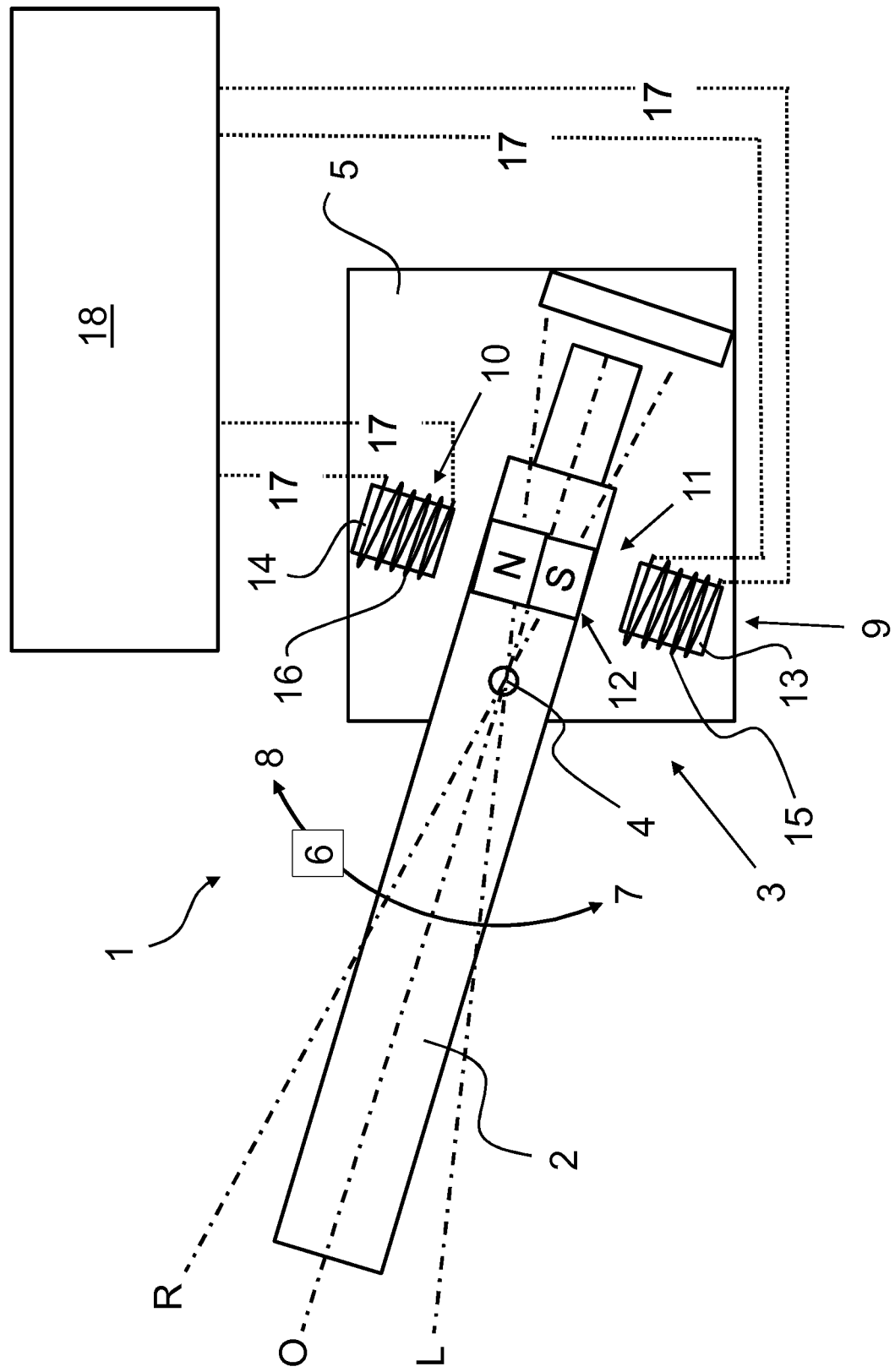

TURN INDICATOR SWITCH WITH ELECTROMAGNETIC LATCHING DEVICE

CROSS-REFERENCE TO RELATED APPLICATIONS

This application claims foreign priority benefits under 35 U.S.C. §119(a)-(d) to DE 10 2013 215 201.9 filed Aug. 2, 2013, which is hereby incorporated by reference in its entirety.

TECHNICAL FIELD

The invention relates to a turn indicator switch for a vehicle and to a method for dynamically resetting a turn indicator switch.

BACKGROUND

Turn indicator switches serve for actuating a turn indicator, also known as a "blinker." In the case of two-track motor vehicles with a steering wheel, said turn indicator switches are generally designed as steering column switches. Steering column switches serve in general for convenient and safe operation of the frequently required functions of a vehicle. They involve devices having at least one lever which acts on a switch connected thereto. The desired function can be implemented by manipulation of the lever.

In order to ensure easy reachability, steering column switches are generally arranged in the region of the vehicle driver. It is preferred in this case for said steering column switches to be fastened to the steering column of the vehicle between the dashboard and steering wheel. In this position, turn indicator switches are frequently combined with additional steering column switches which are used, for example, for actuating a windscreen wiper or a control device for the speed of the vehicle (cruise control).

In the inoperative (OFF) position of the turn indicator switch, the lever thereof is in a substantially horizontal starting position. The lever can be deflected, when required, from said starting position into at least one of two generally opposite switching positions to activate the turn indicator in the desired direction. Toward the end position of the range of movement, the lever is mechanically locked in the respective switching position thereof. In order to subsequently deactivate (switch OFF) the turn indicator, the latching of the lever can be released either manually or mechanically by rotation of the steering wheel.

Since the turn indicator generally serves for indicating an imminent or current turn direction, turn indicator switches are coupled to the steering angle of the steering wheel. This permits automatic resetting (to OFF) of the lever by moving out of the turn. The resetting takes place mechanically. For this purpose, the turn indicator switch contains an adjustment ring which is coupled to the steering wheel and in which a latching device can at least partially engage. As soon as the anticipated wheel angle has taken place, the resetting of the steering wheel is used in order to release the latching engagement by means of the co-rotating adjustment ring. As a result, the lever jumps back out of the deflected switching position thereof into the starting position and the turn of travel indicator is deactivated.

In the event of small steering movements, the movement angle of the adjustment ring may not suffice in order to release the latching device from the switching position.

To this end, DE 10 2006 052 108 A1 proposes a dynamically resettable turn indicator switch. The turn indicator switch comprises a lever which can be deflected from a starting position into two opposite switching positions. Furthermore, a latching device with a latching pin which, in particular in the respective switching position, reaches into the depression in an adjustment ring is provided. By this means, the turn indicator switch can be operated in a customary manner and coupled to the steering angle of the steering wheel. In order then to permit dynamic resetting of the turn indicator switch, additional magnetic actuation of the latching device is provided. For this purpose, the latching pin is formed from metal and is surrounded by a coil. After a defined interval from latching of the lever, an electrical current is temporarily conducted through the coil. Owing to the magnetic field building up, the latching pin is retracted, as a result of which the latching of the lever is released. As a result, the lever jumps back into the starting position thereof and the turn of travel indicator is deactivated.

The magnetically actuable latching device enables resetting of the lever, which resetting can also take place independently of the respective steering angle of the steering wheel. In this manner, for example, drivers of other vehicles are not irritated by a turn indicator which is active without reason, or even obstructed in guiding of their own vehicle.

More recent developments of steering systems provide dynamically variable ratio steering through which the handling of the vehicle is intended to be improved. The turn angle of the steerable road wheels can be changed here independently of the respective steering wheel angle. In other words, systems of this type no longer provide the customary linear transmission of the rotation of the steering wheel to the turning of the coupled wheels, but rather change the ratio of transmission dynamically depending on the respective driving situation. For example, in a parking situation, the wheel angle of the wheels can be significantly increased in relation to the specification via the steering wheel (high ratio) in order to permit maneuvering of the vehicle with as little steering effort as possible. In this manner, tight driving maneuvers can be undertaken with just a small rotation of the steering wheel without having to change grip thereon. By contrast, the stability at high speeds can also be improved by this means by the transmission converting only a small part of a possible steering movement into a wheel angle of the coupled wheels (low ratio).

Since, by this means, there is no longer any linearity between the steering angle at the steering wheel and the actual wheel angle of the coupled road wheels, this has direct effects on the relevant resetting of the turn indicator switch. In view of the turn indicator switches coupled as before mechanically to the steering wheel, the design and the operation of such a turn indicator switch therefore still leave space for improvements, in particular with regard to future steering systems.

SUMMARY

Against this background, the present invention is based on the object of improving a turn indicator switch of the type indicated previously to the effect that said turn indicator switch can be applicably dynamically reset despite a dynamically variable ratio between a steering angle of the steering wheel and a wheel angle of the coupled wheels. Furthermore, a method for actuating a turn indicator switch, with which method dynamic resetting of said turn indicator switch is made possible independently of a dynamically variable ratio between a steering angle of the steering wheel and a wheel angle of the coupled wheels, is intended to be provided.

According thereto, a turn indicator switch for a vehicle, which comprises a lever and a latching device, is disclosed.

The latching device can be actuated magnetically such that the lever of the turn indicator switch can be deflected from a starting position into at least one switching position. Said latching device is designed in order, when required, to hold the lever in the deflected switching position and to release said lever therefrom. According to the invention, the lever here is held magnetically in the deflected switching position thereof.

In contrast to the turn indicator switches known in the prior art, the inventive concept omits the use of mechanical latching means. Mechanical latching means of turn indicator switches customarily comprise an adjustment ring with a latching cam and a latching pin corresponding to the adjustment ring. Depending on the design, in order to rest the lever, either the latching pin is carried along by the rotating adjustment ring or else is obstructed from returning by means of a depression in the adjustment ring.

The advantage arising therefrom can now be seen in the latching of the lever in a manner completely mechanically independently of the respective steering angle of the steering wheel. By this means, the holding and the release of the lever can take place independently of a dynamically variable ratio between the steering angle at the steering wheel and the wheel angle at the coupled wheels. The lever can thus be released from the switching position thereof although a steering movement which is not yet sufficient for a turn indicator switch known in the prior art has taken place at the steering wheel. Conversely, the lever can then also still be held magnetically although the already completed rotation of the steering wheel would have already deactivated a turn indicator switch known in the prior art.

In the present case, deactivating of the turn indicator switch is understood as meaning jumping of the lever back out of the locked switching position thereof into the starting position thereof while simultaneously switching off the turn indicator which is still until now outputting turn signals.

By means of the magnetic holding of the lever in the switching position thereof, diverse structural embodiments for such a realization are conceivable:

The turn indicator switch can thus be held in the deflected switching position thereof, for example, via a magnetic field which, when required, is switched off, weakened or is removed with regard to a means producing said magnetic field. In other words, the lever can be held in the deflected switching position thereof, for example, by means of an electromagnet or a permanent magnet.

When an electromagnet is used, the latter can be switched off in a simple manner in order to release the lever and therefore in order to deactivate the turn indicator switch. Conversely, said electromagnet can be switched on when the lever is deflected from the starting position thereof into the switching position. Alternatively thereto, the electromagnet can be switched on permanently, in which case said electromagnet is temporarily switched off only in order to release the lever from the switching position thereof.

In the present case, switching the electromagnet on or off is understood as meaning the required production of a temporary magnetic field via the electromagnet.

When a permanent magnet is used, the latter can be, for example, pivoted away in order to release the lever from the switching position thereof. Alternatively thereto, said permanent magnet can also be retracted until the magnetic field of the permanent magnet is no longer sufficient to hold the lever in the switching position thereof.

In order to hold the lever, the magnetic field requires a counterpart which is attracted by the magnetic field. A permanent magnet and said counterpart can thus, for example, also be shielded from each other by a separating means, which can be arranged temporarily therebetween, in such a manner that the holding force of the magnetic field is reduced to such an extent that the turn indicator switch is deactivated. Said separating means can also be, for example, in a wedge shape in order to remove the permanent magnet and the counterpart from each other to such an extent that a sufficient holding action between permanent magnet and counterpart is no longer possible.

In a particular embodiment, it is provided that the latching device can have a permanent magnet. The permanent magnet is provided for holding the lever in the deflected switching position thereof. This advantageously permits an overall simple construction of the turn indicator switch in order to hold the lever in the switching position thereof mechanically independently of the respective steering angle of the steering wheel. In addition, simple manual release of the lever from the switching position thereof is ensured. For this purpose, the magnetic force of the magnetic field of the permanent magnet merely has to be overcome. Since the lever is preferably deflected about an axis of rotation, a corresponding lever arm is produced allowing release of the lever without much effort. At the same time, the magnetic force of the permanent magnet can be set in such a manner that the lever is securely held in the deflected switching position thereof even in the event of only slight contact and in particular when the vehicle vibrates.

In an advantageous development of the basic concept of the invention, the latching device can have at least one electromagnet. The use of an electromagnet combines the advantages of the permanent magnet with a mechanically independent release of the lever. For example, the lever can thus be triggered by switching off the electromagnet holding the lever in the deflected switching position thereof, as a result of which the turn indicator switch is deactivated as a whole. The overall simple and durable construction of a turn indicator switch designed in such a manner should also be noted. In addition, the resulting mechanically independent operation permits a maintenance-free and low-wear operation of the turn indicator switch with regard to the lever thereof which is sometimes greatly stressed over time.

A further embodiment provides a combination of electromagnet and permanent magnet. For example, the electromagnet can have a metal core. In this connection, it is provided that the permanent magnet can correspond to the metal core. The required holding force for holding the lever in the deflected switching position thereof can thereby exist by means of the permanent magnetic field of the permanent magnet, which magnetic field acts on the core of the electromagnet.

For this purpose, permanent magnet and electromagnet, in particular the core of the electromagnet, should, for example, be spaced apart in the starting position of the lever to such a distance that a sufficient holding force between the two components does not exist. By the deflection of the lever, the core of the electromagnet and permanent magnet are shifted closer to each other. The convergence causes an increase in the action of the magnetic field on the holding force between the core of the electromagnet and the permanent magnet. At least in the fully deflected switching position of the lever, the holding force should be of such a size that the lever is held in the switching position thereof. In addition to the convergence required for this purpose with a remaining distance between permanent magnet and core of the electromagnet, core and permanent magnet can, of course, also be in touching contact with each other in the end position of the lever.

The combined arrangement of permanent magnet and electromagnet with the core thereof affords advantages in that, for example, the holding force can be increased in the end position of the lever. The permanent magnet thus has a magnetic field which brings about a corresponding holding force. When the electromagnet is switched on, an additional magnetic field is produced. The switched-on magnetic field can be oriented here in such a manner that an additional attraction force between permanent magnet and electromagnet occurs.

Furthermore, it is conceivable for the permanent magnet here to be used as a means for actuating a reed switch. The reed switch can be used, for example, in order to switch on the electromagnet. Consequently, the magnetic field of the permanent magnet is not used or is not primarily used here for holding the lever in the switching position thereof, but rather serves for activating the holding magnetic field by means of the electromagnet.

The electromagnet can preferably have a core made from a ferromagnetic material. Ferromagnetic materials are distinguished by being capable of spontaneous magnetization. Furthermore, a ferromagnetic core is attracted both by a magnetic North pole and by a South pole, which is advantageous in particular with regard to the use of the permanent magnet. Permanent magnets have at least one North pole and one South pole. When the core is formed by ferromagnetic material, the orientation of said core is consequently irrelevant, since the required attraction is basically present with regard to the ferromagnetic core.

Furthermore, the core made from ferromagnetic material can be used as an electromagnet, in particular as a holding magnet, by the arrangement of a coil which surrounds said core and consists of a conductor for electrical current. The core here serves as a yoke in order to reinforce and to guide the magnetic field produced by the coil. The ferromagnetic material is preferably iron.

Within the context of the invention, it is considered as being particularly advantageous if the permanent magnet is arranged on the lever. By contrast, the at least one electromagnet, in particular the core thereof, is then arranged at a distance from the permanent magnet. By deflection of the lever, the permanent magnet arranged thereon is then brought closer to the core of the electromagnet. This arrangement permits a simple construction of the lever since the latter can merely be combined with the maintenance-free permanent magnet. In this respect, any wiring and supply means for conductors in order to supply the electromagnet with the required electrical power are dispensed with. To achieve a result in which deflection of the lever takes place as far as possible without resistance being felt, preference is therefore to be given to the arrangement of the permanent magnet on the lever. Moreover, possible conductors are not subject to a permanent mechanical loads (bending and/or tensile), as could arise if the electromagnet were arranged on the lever.

In an embodiment, a total of two electromagnets can be provided. The basic concept here is the fact that turn indicator switches generally have at least two locked positions of the lever thereof. When two electromagnets are used, the permanent magnet can advantageously be arranged between the two electromagnets. The permanent magnet should be arranged here in such a manner that, in the two generally opposite switching positions of the lever, said permanent magnet can be brought closer to one of the electromagnets in each case.

The starting position is preferably a central position, with it then being possible for the lever to be deflected into two opposite switching positions and also to be able to be transferred therebetween. The permanent magnet can thus be advantageously arranged on a section of the lever, as a result of which, within the context of the deflection of the lever, said permanent magnet can in each case be brought closer to one of the electromagnets and at the same time can be moved away from the other electromagnet.

According to a particularly advantageous embodiment, the electromagnet can be designed for temporarily producing a magnetic field which is oriented in such a manner as to be directed counter to the permanent magnetic field of the permanent magnet in a repelling manner. The magnetic field which can be produced by the electromagnet can thereby not be used for holding the lever in the switching position thereof, but on the contrary in order to remove said lever from the locked switching position thereof.

The advantage here resides in the used of the permanent magnet for holding the lever in the switching position thereof whereas, in order to release the lever, the electromagnet can be switched on. In particular in combination with the presence of two electromagnets and the arrangement of the permanent magnet on the lever between the two electromagnets, an overall functional system for the turn indicator switch according to the invention is provided. The respective core of the electromagnets is preferably used here in order via the holding force of the permanent magnet acting on said electromagnets to enable the lever to be held in one of the deflected switching positions thereof in each case.

Irrespective of the steering angle of the steering wheel, the lever can then be released from the switching position by at least the corresponding electromagnet being switched on. The lever here can be, for example, spring-loaded such that said lever after release from the latching thereof is shifted back again into the starting position by the spring force. Via a suitable controlling means, dynamic resettability of the lever, which can take place independently of the respective steering angle of the steering wheel, is therefore achieved.

The turn indicator switch previously described permits an applicable dynamic resettability of the lever in spite of a dynamically variable ratio between steering angle of the steering wheel and wheel angle of the coupled wheels. Through the consequent omission of parts, which are mechanically in contact with one another, of the latching device, which is of magnetic design in the present case, the resetting of the lever is completely decoupled from the steering movements at the steering wheel of the vehicle. In particular, the combination of the two electromagnets and the permanent magnet arranged therebetween on the lever permits a simple construction which permits permanently maintenance-free operation.

In the present case, a simple possibility for releasing the lever from the respective switching position thereof that only requires the temporary conducting of an electrical current flow to the respective electromagnet has been created. Owing to the mechanical decoupling, the turn indicator switch according to the invention manages with a small number of components in order to realize the dynamic resetting of the lever.

Furthermore, the invention also presents a method for resetting a turn indicator switch for a vehicle, as explained in more detail below:

For this purpose, the turn indicator switch first of all has to comprise a lever and a magnetically actuable latching device. The lever is preferably designed in such a manner that lever it can be deflected from a starting position into at least one switching position. The latching device here is provided to hold the lever in the deflected switching position thereof or to release said lever therefrom. According to the invention, the lever is held magnetically in the deflected switching position thereof.

The advantages and possibilities arising in particular through the proposed measure of magnetically holding the lever have already been explained in conjunction with the turn indicator switch according to the invention shown previously. In order to avoid repetitions, reference is therefore made at this juncture to the previous details which should be regarded as extensive explanations of the method according to the invention. This is furthermore also true of the more detailed refinements of the method according to the invention explained below.

In order to permit the magnetic holding of the lever in the switching position thereof, the latching device can preferably have a permanent magnet. The lever is thereby held in the deflected switching position thereof in an advantageous manner via a magnetic field of the permanent magnet.

The latching device can particularly preferably have at least one electromagnet which is provided for temporarily producing a magnetic field. The magnetic field which can be produced is advantageously oriented in such a manner as to be opposed to the permanent magnetic field of the permanent magnet and so to repel one another. The lever can thereby then be released from the deflected switching position thereof by the temporary magnetic field of the electromagnet.

Further refinements of the turn indicator switch or of the method for operating a turn indicator switch can be produced via a technically expedient combination of individual features and measures or a plurality thereof shown in the previous description and are expressly also claimed within the context of the invention. Further characterizations and specifications of the invention can be produced in particular in conjunction with the figures which are described below and are likewise regarded and claimed as part of the invention.

The invention is explained in more detail below with reference to the exemplary embodiment which is illustrated in the drawing, in which:

BRIEF DESCRIPTION OF THE DRAWINGS

FIG. 1 shows a schematic illustration of a turn indicator switch according to the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The schematic construction of a turn indicator switch 1 according to the invention is shown in FIG. 1. The turn indicator switch 1 is provided in a manner not illustrated specifically for use in a vehicle, in particular in a motor vehicle. In this arrangement, said turn indicator switch serves for actuating a turn indicator (a blinker) which is likewise not shown specifically.

As can be seen, the turn indicator switch 1 comprises a lever 2 and an electromagnetic latching device 3. The lever 2 is connected to a base plate 5 of the turn indicator switch 1 via a structural axle 4. In this arrangement, the lever 2 can be pivoted within a pivoting arc 6 about the axle 4, wherein said lever can be deflected from a first end position 7 to a second end position 8.

In the first end position 7, the lever 2 is in a left switching position L which can be selected with regard to the turn indicator (not illustrated specifically) to indicate that a turn toward the left side is taking place or is intended to take place. The present case illustrates a central starting position O of the lever 2, in which the lever 2 is oriented precisely between the first end position 7 and the second position 8. In the starting position O, the turn signals (not shown) of the vehicle are OFF. Toward the second end position 8 opposite the first end position 7 of the lever 2, the lever 2 is in a right switching position R. The right switching position R can then be selected with regard to the turn indicator (not illustrated specifically) to indicate that a turn toward the right side is taking place or is intended to take place.

In order to temporarily hold or latch the lever 2 in the respective switching position, the electromagnetic latching device 3 has two electromagnets 9, 10 which are arranged on the base plate 5 of the turn indicator switch 1. Said electromagnets 9, 10 are positioned on the base plate 5 in such a manner that a section 11 of the lever 2 is arranged between the two electromagnets 9, 10. A permanent magnet 12 which corresponds in the position thereof between the two electromagnets 9, 10 is arranged in or on the section 11 of the lever 2. In particular in the two switching positions L, R of the lever 2, the permanent magnet 12 is brought closer to one of the two electromagnets 9, 10 in each case or is in touching contact therewith at least in some regions.

With regard to the illustration of FIG. 1, a first electromagnet 9 is arranged at the bottom of a base plate 5 such that, in the right switching position R of the lever 2, the permanent magnet 12 is brought closer to said electromagnet. By contrast, a second electromagnet 10 is arranged above the lever 2, wherein, in the left switching position L of the lever 2, the permanent magnet 12 is brought closer to said electromagnet. The permanent magnet 12 here has a North pole N and a South pole S, wherein the South pole S faces the first electromagnet 9 and the North pole N faces the second electromagnet 10.

It can be seen with respect to the two electromagnets 9, 10 that said electromagnets each have a core 13, 14 and a coil 15, 16 surrounding the respective core 13, 14 in the form of a winding. In the present case, the respective core 13, 14 is formed by ferromagnetic material in order spontaneously to be magnetized via an electrical current flowing through one of the coils 15, 16 in each case. For this purpose, the respective coils 15, 16 are connected via electric conductors 17 in the form of cables to a control unit 18.

In order to dynamically reset the lever 2 of the turn indicator switch 1 according to the invention, the lever 2 first of all should be deflected from the starting position O thereof into one of the two switching positions L, R. In the respective switching position L, R, the section 11 of the lever 2 with the permanent magnet 12 is brought closer to one of the two electromagnets 9, 10 to such an extent that the permanent magnetic field of the permanent magnet 12 exerts a holding force on the respective core 13, 14 of the corresponding electromagnet 9, 10. As a result, the lever 2 remains in the respective deflected switching position L, R thereof, since said lever is held therein magnetically by the permanent magnet 12.

In order to release the lever 2 from the switching position L, R thereof, an electrical current is then conducted via the control unit 18 through the corresponding conductors 17 to the respective electromagnet 9, 10. This produces a temporary magnetic field having a polarity which is opposed to the magnetic field of the permanent magnet 12 and acts in a repelling manner on the North pole N or the South pole S of the permanent magnet 12. As a result, the holding force between the permanent magnet 12 and the respective core 13, 14 is overcome and the permanent magnet 12 is repelled. By this means, the lever 2 is pivoted back about the structural axle 4 in order to return again into the starting position O thereof.

The control unit 18 determines when the respective switching on (energizing) or off (de-energizing) of the corresponding electromagnet 9, 10 takes place. The corresponding energizing/de-energizing signal can be dependent, for example, on the speed of the vehicle, and/or the initial position of the coupled wheels and/or the time elapsed since deflection of the lever 2 into one of the switching positions L, R thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A turn indicator switch for a vehicle, comprising:
a lever pivotally movable from a central position in a first direction to a first switching position and in an opposite second direction to a second switching position;
a first electromagnet located such that movement of the lever to the first switching position brings a portion of the lever closer to the first electromagnet;
a second electromagnet located such that movement of the lever to the second switching position brings the portion of the lever closer to the second electromagnet; and
a control unit controlling energization of the first and second electromagnets in a manner to attract and/or repel the lever to alternatively: a) hold the lever in the first switching position; b) hold the lever in the second switching position; and c) release the lever to return to the central position from the first switching position and from the second switching position.

2. The turn indicator switch of claim 1, further comprising a permanent magnet attached to the portion of the lever between the first electromagnet and second electromagnet.

3. The turn indicator switch of claim 1, wherein the first electromagnet when energized releases the lever to the central position from the first switching position, and the second electromagnet when energized releases the lever to the central position from the second switching position.

4. The turn indicator switch of claim 1, wherein the control unit releases the lever in response to an elapsed time since deflection of the lever to the switching position.

5. The turn indicator switch of claim 1, wherein at least one of the first and the second electromagnet has a core formed of a ferromagnetic material.

6. A turn indicator switch for a vehicle, comprising:
a lever movable between a starting position deactivating a turn signal and a switching position activating the turn signal and having a permanent magnet thereon;
an electromagnet having a ferromagnetic core attracting the permanent magnet to hold the lever in the switching position, and energizable to repel the permanent magnet; and
a control unit energizing the electromagnet to release the lever to the starting position.

7. The turn indicator switch of claim 6, wherein a core of the electromagnet is a ferromagnetic material.

8. The turn indicator switch of claim 6, further comprising:
a second electromagnet having a second ferromagnetic core attracting the permanent magnet to hold the lever in a second switching position corresponding to movement of the lever in a direction opposite from movement to the switching position, and energizable by the control unit to repel the permanent magnet and release the lever to the starting position.

9. The turn indicator switch of claim 6, wherein the control unit releases the lever in response to an elapsed time since deflection of the lever to the switching position.

10. A turn indicator switch for a vehicle, comprising:
a lever movable from a central position in a first direction to a first switching position and in an opposite second direction to a second switching position;
a permanent magnet attached to the lever;
a first electromagnet located such that movement of the lever to the first switching position moves the permanent magnet sufficiently close to a core of the first electromagnet to hold the lever in the first switching position when the first electromagnet is de-energized;
a second electromagnet located such that movement of the lever to the second switching position moves the permanent magnet sufficiently close to a core of the second electromagnet to hold the lever in the second switching position when the second electromagnet is de-energized; and
a control unit operative to energize the first electromagnet to repel the permanent magnet such that the lever returns to the central position from the first switching position, and to energize the second electromagnet to repel the permanent magnet such that the lever returns to the starting position from the second switching position.

11. The turn indicator switch of claim 10, wherein at least one of the first and the second electromagnet has a core formed of a ferromagnetic material.

12. The turn indicator switch of claim 10, wherein the control unit energizes the first electromagnet and/or the second electromagnet in response to an elapsed time since deflection of the lever to the switching position.

* * * * *